United States Patent [19]
Wen

[11] Patent Number: 5,127,883
[45] Date of Patent: Jul. 7, 1992

[54] HOMOGENEOUS SPEED-VARIATING MEANS AS ECCENTRICALLY OPERATED

[76] Inventor: Maz Wen, P.O. Box 4-42, San-Chung, Taipei Hsien(241), Taiwan

[21] Appl. No.: 618,878

[22] Filed: Nov. 28, 1990

[51] Int. Cl.[5] .................. F16H 55/30; B62M 9/08
[52] U.S. Cl. ............................ 474/72; 280/236
[58] Field of Search ............... 474/69, 72; 280/236, 280/238, 237; 74/393, 594.2

[56] References Cited

U.S. PATENT DOCUMENTS

| | | | |
|---|---|---|---|
| 2,042,861 | 6/1936 | Pehl | 474/72 X |
| 2,958,239 | 11/1960 | Bernier | 474/72 X |
| 4,260,386 | 4/1981 | Frohardt | 474/72 |
| 4,299,581 | 11/1981 | Korosue | 474/69 |
| 4,889,354 | 12/1989 | Wen | 280/236 |
| 4,892,506 | 1/1990 | Wen | 280/236 |

FOREIGN PATENT DOCUMENTS

| | | | |
|---|---|---|---|
| 353787 | 10/1937 | Italy | 280/236 |
| 439983 | 10/1948 | Italy | 280/236 |
| 6767 | of 1902 | United Kingdom | 280/236 |

Primary Examiner—Rodney M. Lindsey

[57] ABSTRACT

A speed-variating device especially for a bike includes a first disk secured to a chain wheel having an integral gear formed on a cylindrical flange thereof, a second disk having at least a planet pinion pivotally formed annularly on the second disk engageable with the internal gear, a central eccentric wheel carrying either disk eccentrically about an axle of a bike wheel, a sun gear rotatably mounted on the axle engageable with the planet pinion and having a ratchet gear forwardly driving the bike wheel for forwardly running of the bike, so that a homogeneous wide speed variation can be effected by a first speed variation from the first disk to the eccentric wheel and a second speed variation from the eccentric wheel to the second disk and by a further speed variation by a planetary gear train comprised of the internal gear, the planet pinion and the sun gear for a wider speed variation.

6 Claims, 4 Drawing Sheets

HOMOGENEOUS SPEED-VARIATING MEANS AS ECCENTRICALLY OPERATED

BACKGROUND OF THE INVENTION

U.S. Pat. No. 4,892,506 entitled "Synergetic Speed-Variating Means as Eccentrically Operated" also granted to the applicant of this application discloses a sliding roller carrier means sandwiched between two driving disks respectively secured to a hub of bike wheel and a chain wheel, each disk having a plurality of radial slots formed in the driving disk. When it is intended to variate the bike speed, the central sliding-roller carrier means 2 must be eccentrically operated along the radial slots. However, since the length of each radial slot is quite limited by a radius of each driving disk, the variating ratio can not be greatly increased to satisfy a bike driver's desire for an optional speed variation.

The present inventor has found the limitation of his earlier granted patent, and invented the present homogeneous speed-variating means as eccentrically operated.

SUMMARY OF THE INVENTION

The object of the present invention is to provide a speed-variating means especially for a bike including a first disk secured to a chain wheel having an internal gear formed on a cylindrical flange thereof, a second disk having at least a planet pinion pivotally formed annularly on the second disk engageable with the internal gear, a central eccentric wheel carrying either disk eccentrically about an axle of a bike wheel, a sun gear rotatably mounted on the axle engageable with the planet pinion and having a ratchet gear forwardly driving the bike wheel for forward running of the bike, so that a homogeneous wide speed variation can be effected by a first variation from the first disk to the eccentric wheel and a second speed variation from the eccentric wheel to the second disk and by a further speed variation by a planetary gear train comprised of the internal gear, the planet pinion and the sun gear for a wider speed variation.

DETAILED DESCRIPTION

Figure 1:
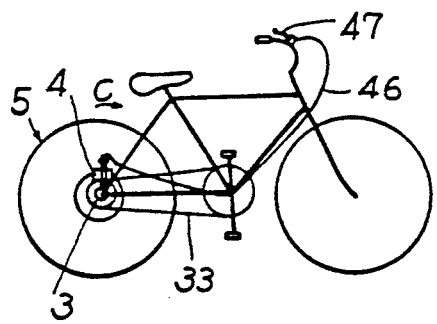
FIG. 1 is an illustration of a bike installed with the present invention.

As shown in FIGS. 1-7, the present invention comprises: a first disk 2, a second disk 2a, a central eccentric wheel 1, a chain wheel 3, and a variable speed adjusting means 4. The chain wheel 3 may be coupled with a chain 33 trodden by a pair of pedals as shown in FIG. 1 for driving a rear wheel 5 which is illustrated in the drawings.

Figure 2:
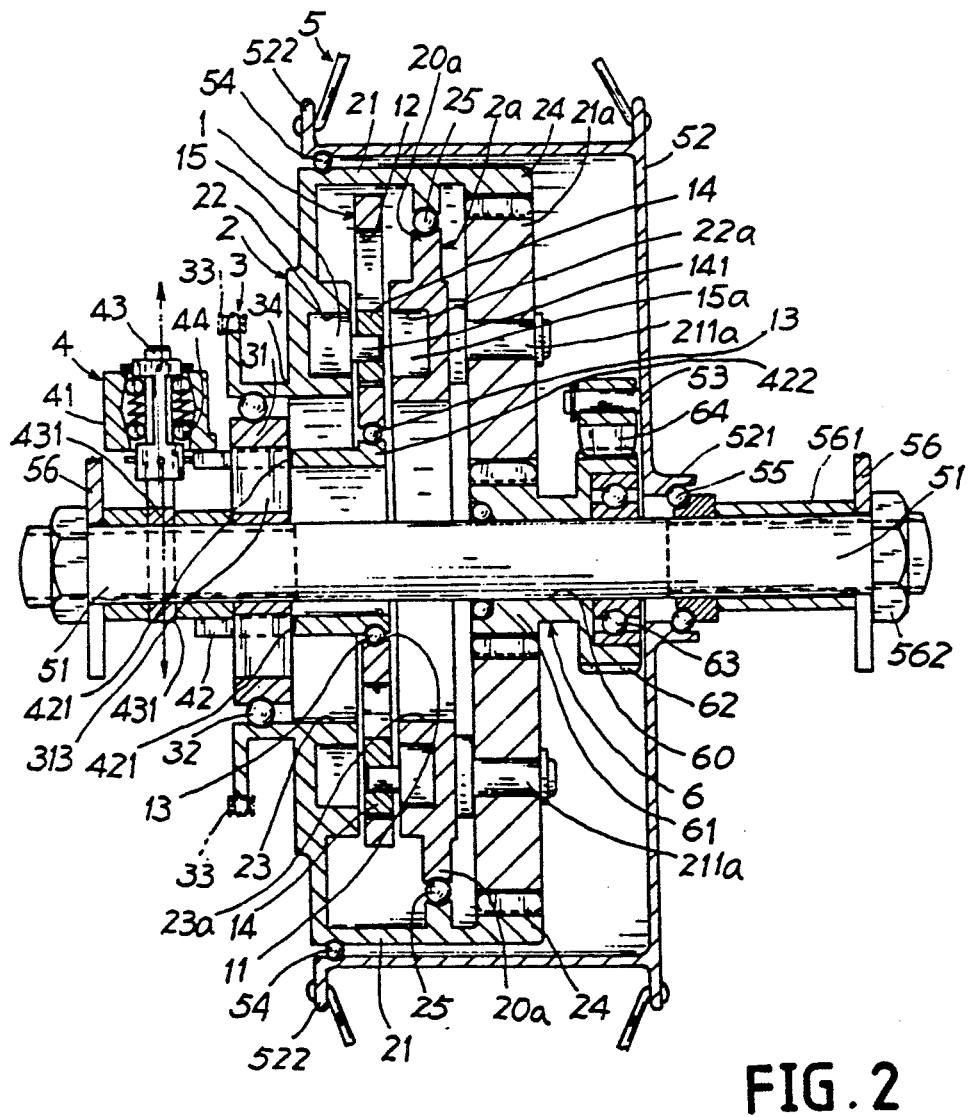
FIG. 2 is an illustration showing the present invention as assembled.
Figure 2A:
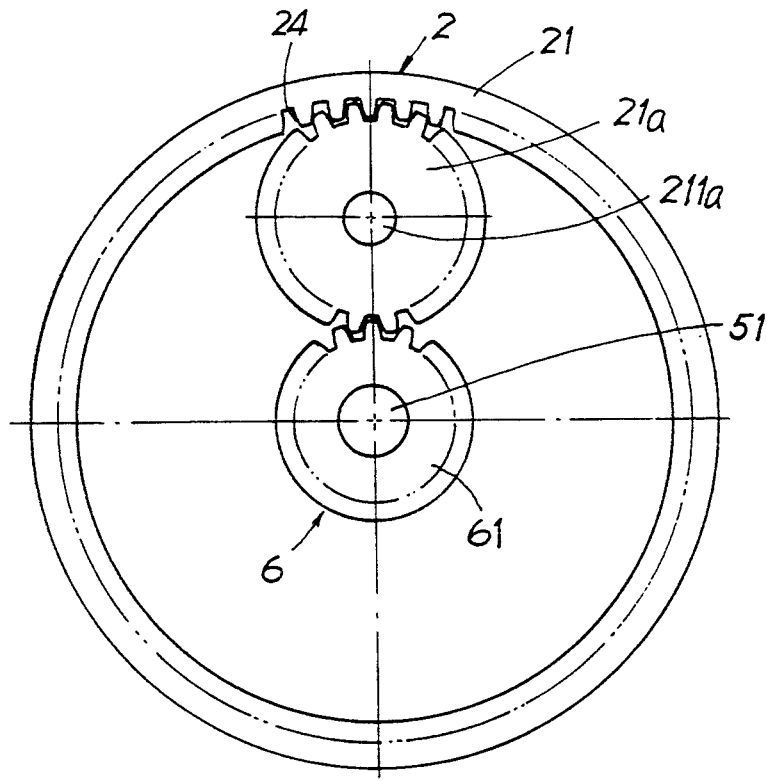
FIG. 2a shows a planetary gear train of the present invention.

The first disk 2 includes: a cylindrical flange 21 formed on an outer periphery of the disk 2 extending rightwardly as shown in FIG. 2, 2a to be formed with an internal gear 24 along an extension periphery edge of the flange 21, an annular groove 22 annularly formed on a right side of the disk 2, and a central collar 23 defining a central hole formed in a central portion of the disk 2 and having a left portion of the collar 23 secured with an inner flange 34 protruding from the chain wheel 3.

Figure 5:
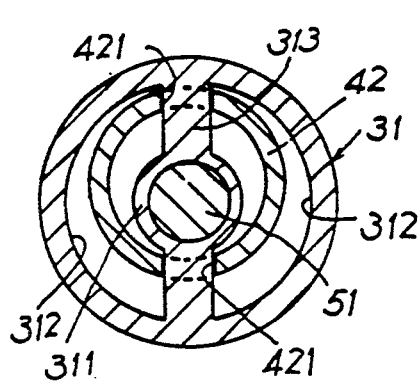
FIG. 5 shows a guiding disk of a chain wheel used in this invention.
Figure 6:
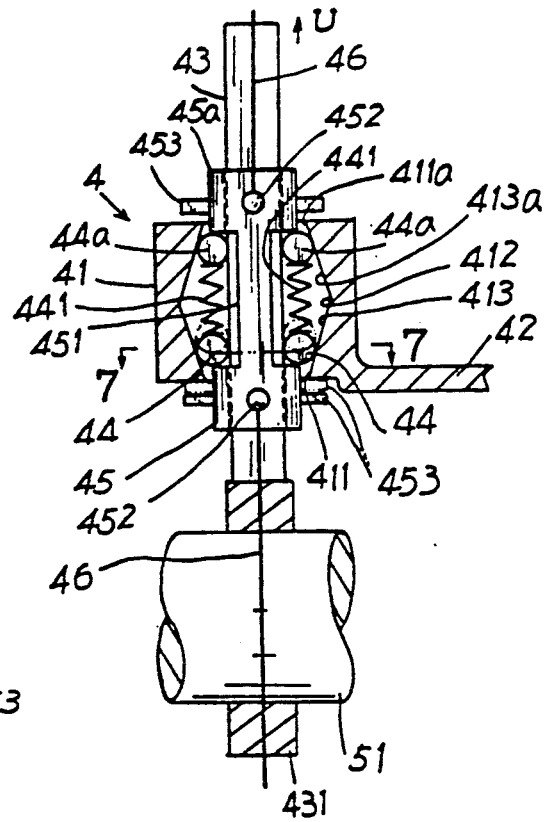
FIG. 6 shows a variable speed adjusting means of the present invention.

The chain wheel 3 is rotatably mounted by a bearing 32 on a guiding disk 31 secured on an axle 51 of the bike wheel such as the rear wheel 5, which guiding disk 31 as shown in FIG. 5 includes a central ring 311 fixed on the axle 51, a vertical stem 313 diametrically formed on a central portion on an upper and a lower portion of the ring 311, and two half-circle notches 312 formed in the disk 31 as centrally partitioned by the vertical stem 313.

Figure 4:
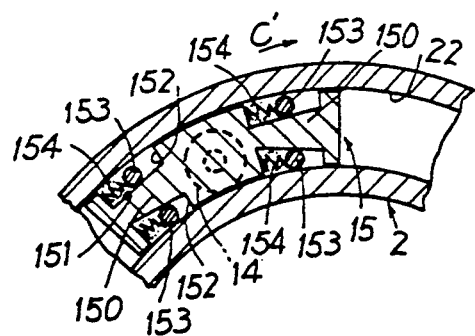
FIG. 4 shows a sliding block as used in the present invention.

The central eccentric wheel 1 includes: a central hole 11 to be rotatably mounted by a bearing 13 on an end flange 422 of an adjusting pipe 42 of the variable speed adjusting means 4, and a plurality of radial slots 12 radially formed in the wheel 1 about a center 10 of the wheel 1 each slot 12 reciprocatively engaging a roller 14. Each roller 14 has a spindle 141 for respectively pivotally securing a pair of sliding blocks 15, 15a on a left side and a right side of the roller 14 as shown in FIG. 2. For instance, the left side sliding block 15 is slidably mounted in the annular groove 22 formed in the first disk. The detailed structure of the sliding block 15 is shown in FIG. 4 which is similar to the sliding block 23 as disclosed in U.S. Pat. No. 4,892,506. For explanation purpose, the sliding block 15 is further described herewith and includes a pair of wedge portions 150 each tapered rearwardly and disposed on a rear and a front side of the block 15, and two pairs of clutching rollers 153 operatively moving on the two wedge portions 150.

Each wedge portion 150 is tapered rearwardly or counterclockwise (if the wheel 1 is rotated clockwise) to form a pair of acute-angle portions 151 at its tapered side and a pair of obtuse-angle portions 152 at an opposite side to the tapered side. Each roller 153 is retained on a rear end acute-angle portion 151 by a tension spring 154. Such a tension spring 154 normally urges the tapered wedge portion 150 towards the obtuse-angle portion 152 to frictionally couple the wedge portion of the block 15 with an annular groove wall so that upon a clockwise rotation of the wheel 1 as driven by the first disk 2 and the chain wheel 3 rotating clockwise C', the sliding block 14 as coupled with the disk 2 will couple the rotation of the first disk 2 and the central eccentric wheel 1.

Figure 3:
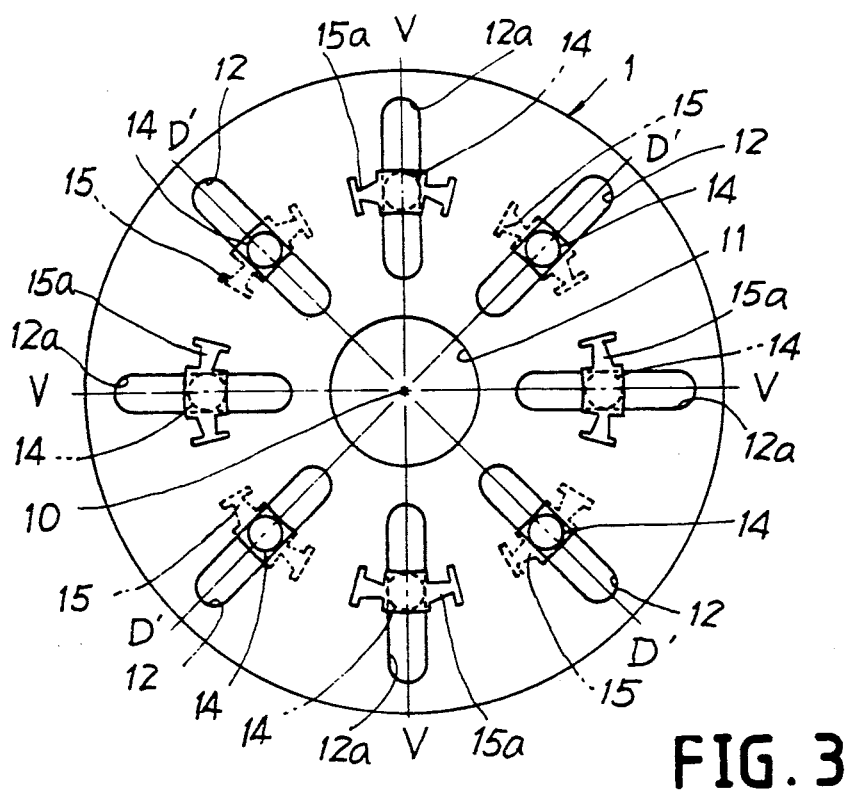
FIG. 3 shows a central eccentric wheel of the present invention.

As shown in FIG. 3, four slots 12 are diagonally arranged on the wheel 1 (D'—D' line on FIG. 3) engageable with four rollers 14 for connecting four sliding blocks 15 on a left side of the wheel 1 engageable with the first disk 2, whereas the other four slots 12a are crossly coordinately arranged on the wheel 1 (V—V line) for connecting other four sliding blocks 15a on a right side of the wheel 1 engageable with the second disk 2a. Therefore, the first disk 2 may drive the central wheel 1 and the wheel 1 may drive the second disk 2a accordingly. The first disk 2 has a bearing 25 formed in the flange 21 for rotatably mounting an outer periphery 20a of the second disk 2a.

The second disk 2a includes: at least a planet pinion 21a pivotally formed on a right side of the disk 2a about a pivot 211a annularly formed on the disk 2a, an annular groove 22a formed on a left side of the disk 2a facing the wheel 1 for engaging the plurality of sliding blocks 15a in the groove 22a, and a central hole 23a which may be rotatably retained on a bearing (not shown) on the axle 51. The sliding blocks 15a engaged in the second disk 2a should have an orientation of tapered wedge portion 150 opposite to the block 15 in the first disk 2 as shown in FIG. 3.

The axle 51 is fixed on a fork 56 by sleeve 561 and nut 562 as shown in FIG. 2 having a right bearing 55 rotatably engaging a central bush 521 of a hub 52 secured with the bike wheel 5 and a left bearing 54 rotatably engaging an outer flange 522 of the hub 52 with the disk 2.

An output gear 6 is provided in this invention, which includes: a central hole 60 rotatably engaging the axle 51 by bearing 63, a sun gear 61 engageable with the planet pinion 21a, a ratchet gear 62 secured with the sun gear 61 rotatably engageable with a pawl 64 formed on a central portion 53 of the hub 52 for forwardly driving the hub 52 and the bike wheel 5 and for reversely disengaging the ratchet gear 62 from the hub 52 for a reverse free rotation of chain wheel 3 or backing running of the bike wheel 5.

The ratio between a diameter of internal gear 24, a diameter of pinion 21a and a diameter of the sun gear 61 can be optionally set when making the present invention for pre-setting a variation ratio of output revolutions of the gear 61 and the wheel 5 to the input revolutions of the relevant wheels or disks.

The variable speed adjusting means 4 as shown in FIG. 6, 7, 2 and 5 includes: a locking sleeve 41 generally square shaped, an adjusting pipe 42 secured to a bottom portion of the sleeve 41, a vertical shaft 43 poking upwardly through the sleeve 41 having a base collar 431 secured on the axle 51, two pairs of braking rollers 44, 44a resiliently retained in the sleeve 41 respectively disposed around the vertical shaft 43, a pair of driving ferrules 45, 45a secured with each other by two linking plates 451 formed on an upper and a lower side of the sleeve 41, and an actuating wire 46 (may also be two wires) secured between either ferrule 45, 45a and a control lever 47 formed on a handle bar as shown in FIG. 1.

Figure 7:
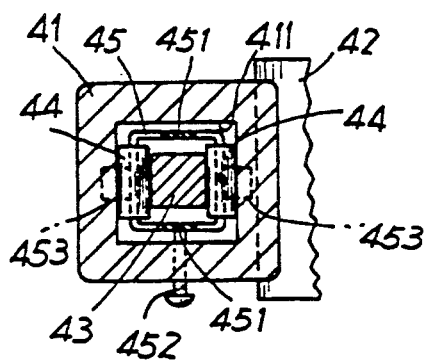
FIG. 7 is a top view from 7—7 direction of FIG. 6.

The locking sleeve 41 may be a square sleeve as shown in FIG. 7 and includes two contraction holes 411, 411a respectively formed in a lower and an upper portion of the sleeve 41, an expansion recess 412 formed inside a central portion of the sleeve 41, two lower sloping surfaces 413 each tapered downwardly from the expansion recess 412 towards the lower contraction hole 411, and two upper sloping surfaces 413a each tapered upwardly from the recess 412 towards the upper contraction hole 411a.

Each pair of braking rollers 44, 44a includes a lower roller 44 normally retained between the lower sloping surface 413 and the vertical shaft 43 as urged by a spring 441 connected with an upper roller 44a which roller 44a is normally retained between the upper sloping surface 413a and the shaft 43 as urged by the spring 441 so as to normally brake the sleeve 41 on the shaft 43, thereby positioning the pipe 42 and the eccentric wheel 1 on a fixed position.

Either ferrule 45 or 45a includes a pair of side lugs 453 protruding rightwardly and leftwardly normally positioned slightly apart from the bottom or upper surface of the sleeve 41, but operatively raising or depressing the sleeve 41 either upwardly or downwardly. The contour or size of the ferrule 45, 45a is smaller than the contraction hole 411 or 411a, but touchable with the rollers 44, 44a for moving the rollers for unlocking the sleeve 41. A screw or two screws 452 may be fixed on the ferrule for connecting one wire (or two wires) 46.

The adjusting pipe 42 (FIG. 2, 5) is formed with a vertical slot 421 through the pipe for free passing the vertical stem 313 of the guiding disk 31 in the chain wheel 3, allowing a vertical reciprocative movement of the pipe 41, and the eccentric wheel 1 for eccentric adjustment.

For accelerating the revolutions of this invention, the eccentric wheel 1 as raised by pulling the wire 46 upwardly to raising the lower ferrule 45 to disengage the rollers 44 to unlock the braked sleeve 41 and the lugs 453 will then raise the sleeve 41, the pipe 42 and the wheel 1 upwardly as shown in the figures.

Figure 8:
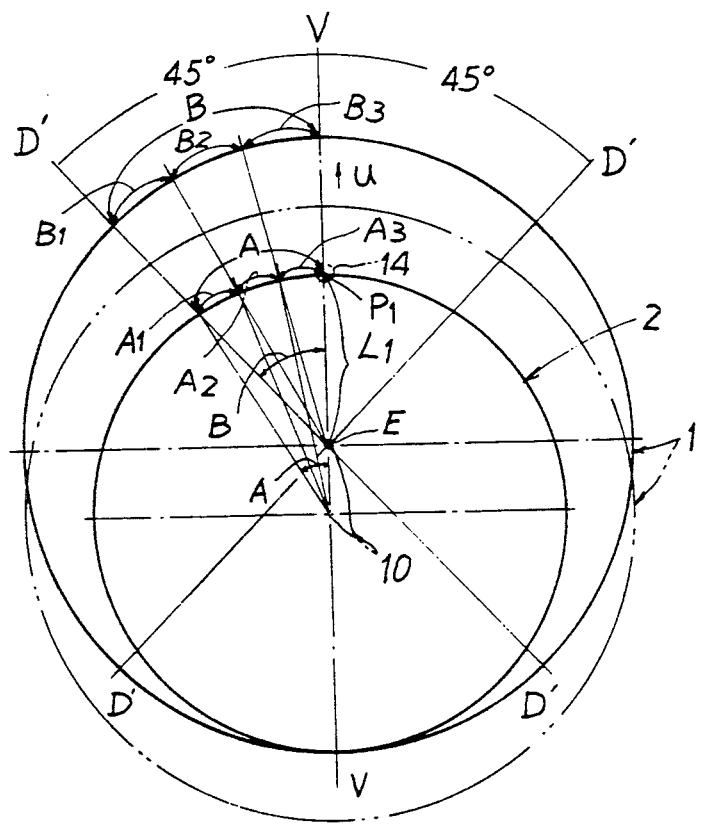
FIG. 8 shows a first speed variation in accordance with the present invention.

In FIG. 8, a first speed variation from the first disk 2 to the eccentric wheel 1 is illustrated, wherein the disk 2 driving the wheel 1 will obtain a greatest variation at an upper point P1 on line V—V since the length L1 between an actuating roller 14 and the eccentric center E is the shortest. An output variated angle B of wheel 1 from an input variating angle A of disk 2 is shown in FIG. 8 in which angle B is larger than angle A to prove the speed increase in terms of increased angle. The first speed variation is designated as R1 which is equal to B/A.

If the angles A, B are differentiated, several example angle segments can be subsequently measured and the variations R1 can be respectively obtained as follows:

| | | |
|---|---|---|
| $A1 = 11°$ | $B1 = 14.5°$ | $R1 = 1.318$ |
| $A2 = 11°$ | $B1 = 15.1°$ | $R1 = 1.372$ |
| $A3 = 11°$ | $B1 = 15.4°$ | $R1 = 1.4$ |

Figure 10:
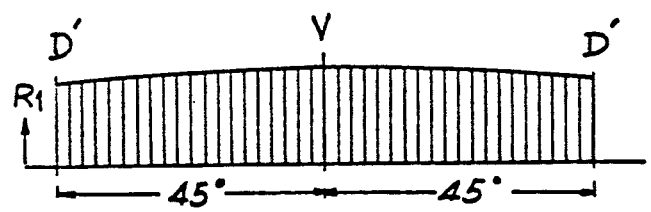
FIG. 10 is an illustration showing a differential relationship of the speed variations effected in this invention.
Figure 10:
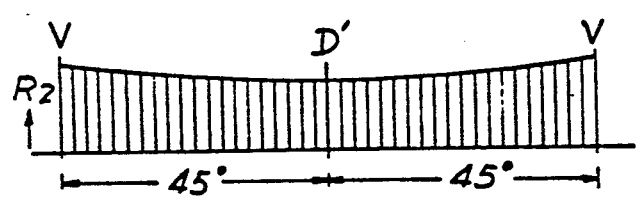
Figure 10:
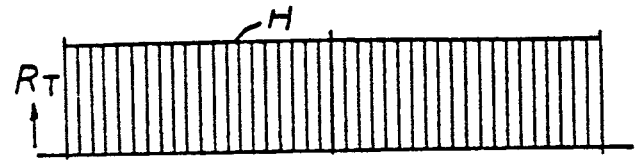

By the way, the first variation R1 versus angles can be plotted as shown in FIG. 10.

Figure 9:
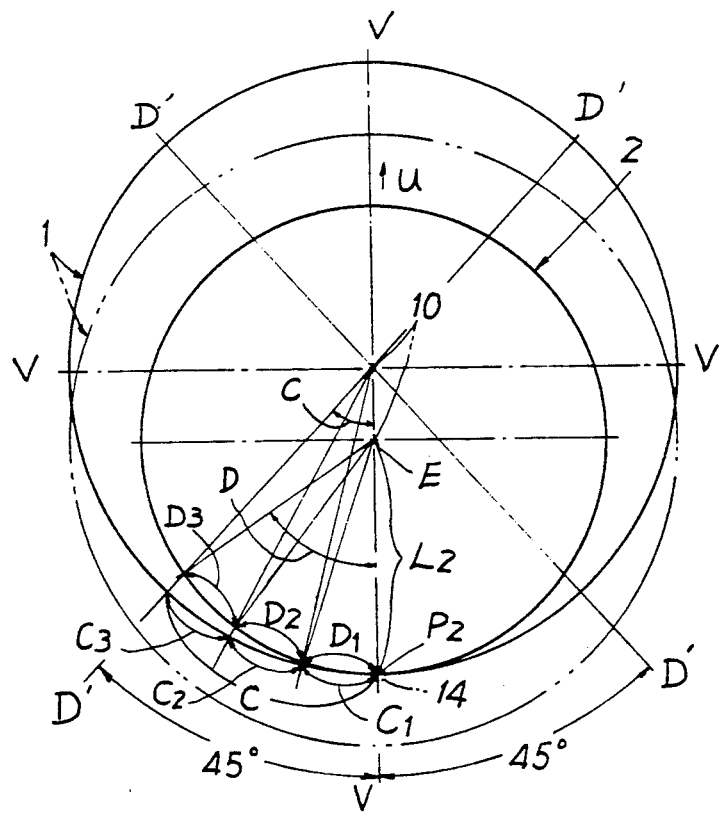
FIG. 9 shows a second speed variation in accordance with the present invention.

In FIG. 9, a second speed variation from the eccentric wheel 1 to the second disk 2a is illustrated, wherein the wheel 1 driving the disk 2a will obtain a greatest variation at point P2 on line V—V since the length L2 between an actuating roller 14 and the eccentric center E is the shortest. An output variated angle D of disk 2a from an input variating angle C of wheel 1 is shown in FIG. 9 in which angle D is larger than angle C to indicate the speed increase in terms of increased angle. The second speed variation is designated as R2 which is equal to D/C.

The angles C, D are then differentiated and measured, such as:

| | | |
|---|---|---|
| $C1 = 15°$ | $D1 = 19.5°$ | $R2 = 1.3$ |
| $C2 = 15°$ | $D2 = 18.8°$ | $R2 = 1.253$ |
| $C3 = 15°$ | $D3 = 17.8°$ | $R2 = 1.186$ | from which, R2 vs angles is illustrated in FIG. 10.

Since total variation $R_T$ is equal to $R1 \times R2$, the following formula is obtained:

$$R_T = R1 \times R2 = B/A \times D/C$$

Therefore a multiplied product of the total variation can be calculated and illustrated in FIG. 10 to form a general horizontal plane H, indicating a stable homogeneous speed variation can be effected in accordance with the present invention.

Regarding the plantary gear system or train comprised of the internal gear 24, planet pinions 21a, and sun gear 61 of this invention, if the output revolution of gear 61 and hub 52, wheel 5 is designated as Na, the revolutions of second disk 2a designated as Nb, revoluations of first disk 2 as Nc, and the diameter of first disk 2 or gear 24 is designated as Dc and the diameter of gear 61 as Da, the following formula can be obtained, $$Na = (Dc/Da + 1) \times Nb - Dc/Da \times Nc$$

Since $Nb/Nc = R_T = R1 \times R2$, if a driving speed of the first disk is known, the output speed variation of this invention will then be easily obtained.

The ratio between Dc to Da can be optionally set up in making the present invention. For instance, if the diameter of gear 61 (Da) is 2 cm and the diameter of disk 2 (Dc) is 20 cm, and if the ratio of Nb/Nc is simply assumed to be 2, the Na will be:

$$Na = (20/2 + 1) \times 2 - 20/2 \times 1 = 22 - 10 = 12$$

A single one revolution of disk 2 will obtain 12 times of revolutions of wheel 5, therefor greatly enhancing the speed variation in a wider range of the present invention to be superior to any conventional speed variating systems.

The present invention may also be used for a speed variation system of a motorcycle or other vehicles, or transmission systems, which modifications are not limited in this invention.

I claim:

1. A speed-variating means comprising:
   a first disk including a cylindrical flange extending rightwardly to form an internal gear along an extension periphery edge of the cylindrical flange, a first annular groove annularly formed on a right side of said disk, and a central collar secured to an inner flange of a chain wheel having a chain for driving the chain wheel and the first disk;
   a central eccentric wheel including a central hole, a plurality of radial slots radially formed in the eccentric wheel each said slot reciprocatively engaging a roller therein;
   a second disk including at least a planet pinion pivotally formed on a right side of said second disk annularly disposed on said second disk, a second annular groove formed on a left side of said second disk facing said eccentric wheel, said planet pinion engageable with said internal gear;
   said central eccentric wheel sandwiched between said first disk and said second disk having half said radial slots provided with rollers each said roller pivotally secured with a left sliding block engageable in said left annular groove for forwardly driving said first disk and said eccentric wheel, and having the other half said radial slots provided with rollers each said roller pivotally secured with a right sliding block engageable in said right annular groove for forwardly driving said second disk coupled with said eccentric wheel, each said left sliding block being projectively adjacent to each said right sliding block;
   an output gear having a sun gear rotatably mounted on an axle engageable with said planet pinion and having a ratchet gear secured to said sun gear engageable with a pawl secured with a hub for forwardly rotating said hub, said hub respectively rotatably mounted on said axle and said first disk;
   a variable speed adjusting means secured on said axle having an adjusting pipe protruding rightwardly for rotatably mounting said central eccentric wheel through a guiding disk which guiding disk fixed on said axle for rotatably mounting said chain wheel, whereby upon an adjustment of said variable speed adjusting means to raise said adjusting pipe and said eccentric wheel and upon a driving of said chain wheel, said first disk will eccentrically rotate said central eccentric wheel for a first speed variation and said eccentric wheel will eccentrically rotate said second disk for a second speed variation;
   said internal gear, said planet pinion and said sun gear forming a planetary gear train for a further speed variation.

2. A speed-variating means according to claim 1, wherein said guiding disk includes a central ring fixed on said axle, a vertical stem diametrically formed on a central portion on an upper and a lower portion of said ring, and two half circle notches centrally partitioned by said vertical stem, said vertical stem for guiding an upward and a downward movement of said adjusting pipe which is formed with a vertical slot through said adjusting pipe for movable engaging said vertical stem.

3. A speed-variating means according to claim 1, wherein said eccentric wheel includes eight said radial slots having four radial slots diagonally arranged for respectively pivotally securing said left sliding blocks for coupling said first disk, and having the other four slots crossly coordinately arranged for pivotally securing said right sliding blocks for coupling said second disk.

4. A speed-variating means according to claim 1, wherein said variable speed variating means includes: a locking sleeve normally locked on a vertical shaft secured on said axle by a plurality of braking rollers held in said sleeve, said adjusting pipe secured to said sleeve, at least a driving ferrule normally riding on said variable speed variating means for contacting said braking rollers having a wire secured to an actuating lever formed on a handle bar, whereby when raising said ferrule to disengage the braking rollers from said sleeve and said vertical shaft, said sleeve will be raised to lift said adjusting pipe and said eccentric wheel for its eccentric operation and speed variation.

5. A speed-variating means according to claim 4, wherein said locking sleeve generally formed as a square sleeve includes: two contraction holes respectively formed in a lower and an upper portion of the sleeve, an expansion recess formed inside a central portion of the sleeve, two lower sloping surfaces each tapered downwardly from the expansion recess towards the lower contraction hole, and two upper sloping surfaces each tapered upwardly from the recess towards the upper contraction hole and two pairs of braking rollers disposed on two sides of said vertical shaft each pair of braking rollers having a lower braking roller normally retained between the lower sloping surface and the vertical shaft as urged by a spring which spring connected with an upper braking roller which upper roller is normally retained between the upper sloping surface and the shaft as urged by the spring so as to normally brake the sleeve on the vertical shaft, thereby positioning the adjusting pipe and the eccentric wheel on a fixed position.

6. A speed-variating means according to claim 4, wherein two driving ferrules are connected by two linking plates, each said ferrule having a pair of side lugs protruding rightwardly and leftwardly normally positioned slightly apart from the bottom or upper surface of the sleeve, but operatively raising or depressing the sleeve either upwardly or downwardly, a contour or size of the ferrule being smaller than the contraction hole, but touchable with the braking rollers for operatively moving said braking rollers for unlocking said sleeve.

* * * * *